United States Patent
Kumar

(10) Patent No.: US 11,250,134 B2
(45) Date of Patent: Feb. 15, 2022

(54) SECURE COMPUTATION ENVIRONMENT

(71) Applicant: CRYPTOGRAPHY RESEARCH, INC., Sunnyvale, CA (US)

(72) Inventor: Ambuj Kumar, Sunnyvale, CA (US)

(73) Assignee: Cryptography Research, Inc., San Jose, CA (US)

( * ) Notice: Subject to any disclaimer, the term of this patent is extended or adjusted under 35 U.S.C. 154(b) by 14 days.

(21) Appl. No.: 15/739,105

(22) PCT Filed: Aug. 10, 2016

(86) PCT No.: PCT/US2016/046428
§ 371 (c)(1),
(2) Date: Dec. 21, 2017

(87) PCT Pub. No.: WO2017/034811
PCT Pub. Date: Mar. 2, 2017

(65) Prior Publication Data
US 2018/0181760 A1    Jun. 28, 2018

Related U.S. Application Data

(60) Provisional application No. 62/208,490, filed on Aug. 21, 2015.

(51) Int. Cl.
*G06F 21/57*    (2013.01)
*G06F 21/51*    (2013.01)
(Continued)

(52) U.S. Cl.
CPC .......... *G06F 21/575* (2013.01); *G06F 9/4401* (2013.01); *G06F 21/44* (2013.01);
(Continued)

(58) Field of Classification Search
CPC .......... G06F 21/575; G06F 21/44; G06F 21/51
See application file for complete search history.

(56) References Cited

U.S. PATENT DOCUMENTS 6,904,523 B2 * 6/2005 Bialick .................. G06F 21/10
                                                            705/59
7,316,027 B2    1/2008 Burch et al.
(Continued)

FOREIGN PATENT DOCUMENTS

CN    102208000 A    10/2011
CN    102289631 A    12/2011

OTHER PUBLICATIONS

Tsai, W. T et al. "Simulation Verification and Validation by Dynamic Policy Specification and Enforcement." Simulation (San Diego, Calif.) 82.5 (2006): 295-310. Web. (Year: 2006).*

(Continued)

*Primary Examiner* — Thanhnga B Truong
*Assistant Examiner* — Angela R Holmes
(74) *Attorney, Agent, or Firm* — Lowenstein Sandler LLP

(57) ABSTRACT

A container corresponding to executable code may be received. In response to receiving the container, a container manager resident in a memory of a computation environment may be executed to verify the container. The container manager may be verified by a boot loader of the computation environment. Permissions of the container to access the resources of a computation environment may be determined after the verification of the container by the container manager. Access to one or more resources of the computation environment may be provided by transferring control to the one or more resources from the container manager to the container based on the permissions of the container for the resources of the computation environment.

22 Claims, 12 Drawing Sheets

(51) Int. Cl.
　　　*G06F 9/4401*　　　(2018.01)
　　　*G06F 21/44*　　　(2013.01)
　　　*H04L 9/32*　　　(2006.01)

(52) U.S. Cl.
　　　CPC ............ *G06F 21/51* (2013.01); *H04L 9/3247* (2013.01); *G06F 2221/034* (2013.01)

(56) References Cited

U.S. PATENT DOCUMENTS

| | | | |
|---|---|---|---|
| 7,382,880 B2 | 6/2008 | Angelo et al. | |
| 7,631,188 B2 | 12/2009 | Valente | |
| 8,271,783 B2 | 9/2012 | Ibrahim et al. | |
| 8,613,081 B2 | 12/2013 | Beals | |
| 8,700,895 B1 | 4/2014 | Naguib | |
| 8,843,764 B2 | 9/2014 | Hussain | |
| 8,874,916 B2 | 10/2014 | Smith et al. | |
| 9,729,579 B1* | 8/2017 | Marino | H04L 63/123 |
| 10,044,695 B1* | 8/2018 | Cahill | H04L 63/08 |
| 2003/0046238 A1* | 3/2003 | Nonaka | H04H 60/18 705/51 |
| 2006/0010136 A1* | 1/2006 | Deangelo | G06F 16/93 |
| 2006/0090084 A1 | 4/2006 | Buer | |
| 2006/0259764 A1* | 11/2006 | Asal | G06F 9/30054 713/166 |
| 2009/0265756 A1 | 10/2009 | Zhang et al. | |
| 2009/0271844 A1* | 10/2009 | Zhang | G06F 12/1458 726/2 |
| 2010/0023739 A1 | 1/2010 | Levit-Gurevich et al. | |
| 2010/0023743 A1 | 1/2010 | Sastry et al. | |
| 2012/0180039 A1 | 7/2012 | Bravery et al. | |
| 2013/0014254 A1* | 1/2013 | Gladwin | G06F 3/0619 726/22 |
| 2013/0159726 A1* | 6/2013 | Mckeen | G06F 21/53 713/189 |
| 2014/0096133 A1 | 4/2014 | Kundu et al. | |

OTHER PUBLICATIONS

Extended European Search Report dated Dec. 13, 2018 re: EP Appln. No. 16839800.6. 9 pages.

Notification of Transmittal of the International Search Report and the Written Opinion of the International Searching Authority dated Oct. 21, 2016 re: Int'l Appln. No. PCT/US16/046428. 8 Pages.

EP Response Filed on Jul. 15, 2019 in Response to the Extended European Search Report dated Dec. 13, 2018 and the Communication Pursuant R. 70(2) and 70a(2) EPC dated Jan. 8, 2019 re: EP Appln. No. 16839800.6. 29 Pages.

EP Communication Pursuant to Article 94(3) EPC dated Aug. 13, 2019 re: EP Appln. No. 16839800.6. 4 Pages.

IN First Examination Report dated Mar. 30, 2021 re: India Appl. No. 201817000468. 9 pages.

CN Office Action dated May 6, 2021 re: CN Appln. No. 201680042707. 6. 11 pages. (w/Translation).

\* cited by examiner

SECURE COMPUTATION ENVIRONMENT

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
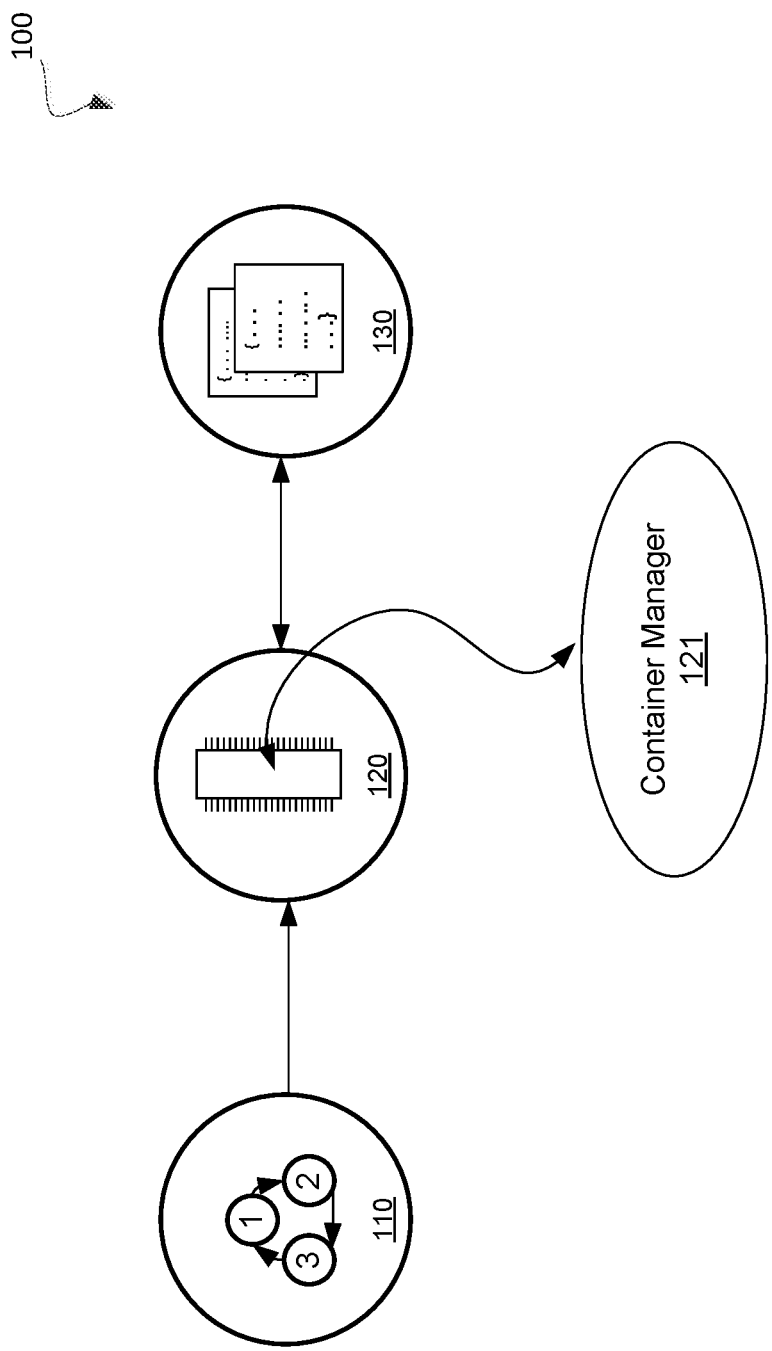
FIG. 1 illustrates an example secure computation environment with a bootloader, a container manager, and one or more containers in accordance with some embodiments of the present disclosure.

Aspects of the present disclosure are directed to a secure computation environment. A system or device may include a bootloader, a container manager, and one or more containers that may be used to provide a secure computation environment. The bootloader may be a hardware-based state machine that may be initiated or executed in response to an initialization of the system or device. During the execution of the bootloader, a container manager that is stored in a memory, such as a read-only-memory (ROM) of the system or is stored via the interconnect of the system or device (e.g., as represented by a netlist), or stored in flash memory or other storage on the system or device, may be executed after the bootloader has performed initialization procedures for the secure computation environment and has verified the container manager.

The bootloader may verify the container manager. The verification may include hashing and comparing the result with an expected result. For example, the hashing may correspond to a Secure Hash Algorithm (SHA) operation such as an SHA-2 or SHA-3 operation. Alternatively, the verification may include the bootloader using public key cryptography. For example, the verification may be based on an Elliptic Curve Cryptography Digital Signature (ECDS) operation. After the container manager has been verified, the bootloader may allow the container manager to control a central processing unit (CPU) or other such processing device or hardware of the secure computation environment of the system or device. The container manager may be the software of the system or device with higher or highest privileges that provide certain functionality to subsequently received containers that correspond to unsecure user code. Thus, the bootloader may verify the container manager and authorize the container manager to control a CPU of the system or device after the container manager has been verified.

The container manager may provide a framework for the execution of containers. Each container may correspond to executable code or instructions (e.g., received after manufacturing of the system or device) and permissions to access certain functionality or resources of the system or device. The container manager may receive and execute the containers in series so that the resources of the secure computation environment of the system or device are shared, or timeshared, by the containers.

The framework provided by the container manager may further facilitate communication or interaction between containers. For example, the container manager may execute a first container and receive data from the first container that is to be stored in an inter-process communication (IPC) register or memory. The first container may further specify to the container manager an identification of a subsequent container that is authorized to receive the data. The container manager may subsequently store the data received from the first container, an identification of the recipient container (e.g., the identification of the subsequent container to which the data is intended to be received), and an identification of the sender of the data (e.g., the first container) in the IPC register or memory. Subsequent containers may be executed by the container manager and when the second container is executed by the container manager, the container manager may provide the data from the first container that is stored in the IPC register to the second container so that the data may be used during the execution of the second container. The container manager may restrict access to the IPC register or memory if the second container's identification is different from the recipient container's identification. The container manager may store the sender container identification in the IPC itself register or memory so that the sender container may not provide a false identification.

The container manager may further provide functionality to a container to communicate with components or entities outside of the secure computation environment. For example, the system may include high-level operating system (HLOS) registers or memory that may be used to provide an indication of a request for data from a container and receive the corresponding data for the container from an external entity that is outside of the secure computation environment. For example, a container may transmit data to the container manager for storage at a HLOS register that indicates a request for a particular type of data. An external software application or component may access the HLOS register and may identify that the HLOS register currently indicates the request for the particular type of data. In response, the external software application or component may provide the requested data for the HLOS register and the container manager may allow the container to retrieve the data received from the external software application or component that is currently stored in the HLOS register or memory.

Furthermore, the secure computation environment may allow a container to verify the container manager. For example, the bootloader may provide a version number or other such identification of the container manager when the bootloader is executed and may store the version number in a particular register or memory location. A container that is executed by the container manager may include instructions to verify the version number of the container manager. For example, the container may be provided access to the version number in the particular register or memory location and may be executed based on the version number of the container manager. For example, if the version number of the container manager matches an authorized version number of the container manager from the instructions of the container, then the container may be executed. However, if the version number of the container manager does not match the authorized version number of the container manager from the instructions of the container, then the container may not further execute or perform operations of its instructions.

Accordingly, aspects of the present disclosure may provide for a secure computation environment where a bootloader of a system or a device may verify a container manager that may further provide a framework for the execution of user code in the form of containers. Furthermore, the containers may further verify the container manager so that the execution of the containers may be performed in a secure computation environment.

FIG. 1 illustrates an example secure computation environment 100 with a bootloader 110, a container manager 121 stored in a read-only memory 120, and one or more containers 130. In general, the secure computation environment 100 may correspond to a portion of a system or a device that provides a secure computation environment for one or more containers 130.

As shown in FIG. 1, the secure computation environment 100 may include a bootloader 110 that interacts with a container manager 121 that is stored in a read-only memory (ROM) 120 of a device that includes the secure computation environment 100. The bootloader 110 may be a hardware-based state machine that is executed in response to an initialization (i.e., power-up) of the secure computation environment 100 or a device that includes the secure computation environment 100. Furthermore, the bootloader 110 may perform a series of power-on self-tests (e.g., a procedure performed immediately after power-on or start up) of the secure computation environment 100. The self tests performed by the bootloader 110 may include a verification or performance test of the hardware components of the secure computation environment 100. For example, the self-tests may include a test of the CPU or processing device that is part of the secure computation environment 100. The bootloader 110 may further perform an integrity check of the contents of the ROM 120 of the secure computation environment 100. For example, the bootloader 110 may perform a verification or integrity check of the container manager 121 by retrieving the contents of the container manager 121 and computing an integrity check value of the contents of the container manager 121. The computed integrity check value may be compared with another stored integrity check value to determine the authenticity or verification of the container manager 121. The integrity check value may correspond to a hash value that is based on a hash function that is used to map digital data of arbitrary size (e.g., the contents of the container manager 121) to digital data of a fixed size (e.g., the computed integrity check value). Further details with regard to the execution of the bootloader are described in conjunction with FIG. 3.

After a successful completion of the self-tests, the bootloader 110 may initiate or execute the container manager 121 that is stored in the ROM 120. For example, the bootloader 110 may initiate the container manager 121 after verifying the CPU and the ROM 120 or other memory of the secure computation environment 100. The control of the CPU or other hardware resources of the secure computation environment 100 may then be provided from the bootloader 110 to the container manager 121. In some embodiments, the container manager 121 may correspond to a trusted embedded light-weight software that provides functionality to hardware resources and software resources of the secure computation environment. For example, the container manager 121 may provide an application programming interface (API) that defines functionalities such as system calls to access software resources or hardware resources of the secure computation environment 100. The container manager 121 may further receive one or more containers 130 that correspond to untrusted user code that is received from outside of the secure computation environment 100. The container manager 121 may verify permissions of a received container 130 to access resources of the secure computation environment 100, verify the authenticity of the received container 130, and provide a framework for communication between containers 130 as well as communication between containers 130 and external entities or components that are external to the secure computation environment 100. Further details with regard to the container manager 121 are disclosed in conjunction with FIGS. 5A-10.

The container manager 121 may be executed in response to receiving one of the containers 130 or in response to one of the containers 130 executing a system call to access resources of the secure computation environment 100. After a verification of a received container, the container manager 121 may provide control of the CPU or processing device of the secure computation environment 100 to the received container. Each of the one or more containers 130 may further correspond to untrusted user code that provides instructions and/or data for accessing resources of the secure computation environment 100. As described in additional detail with regard to FIG. 5A, the containers 130 may be received in a series so that the resources of the secure computation environment 100 are timeshared between the containers 130.

Figure 2:
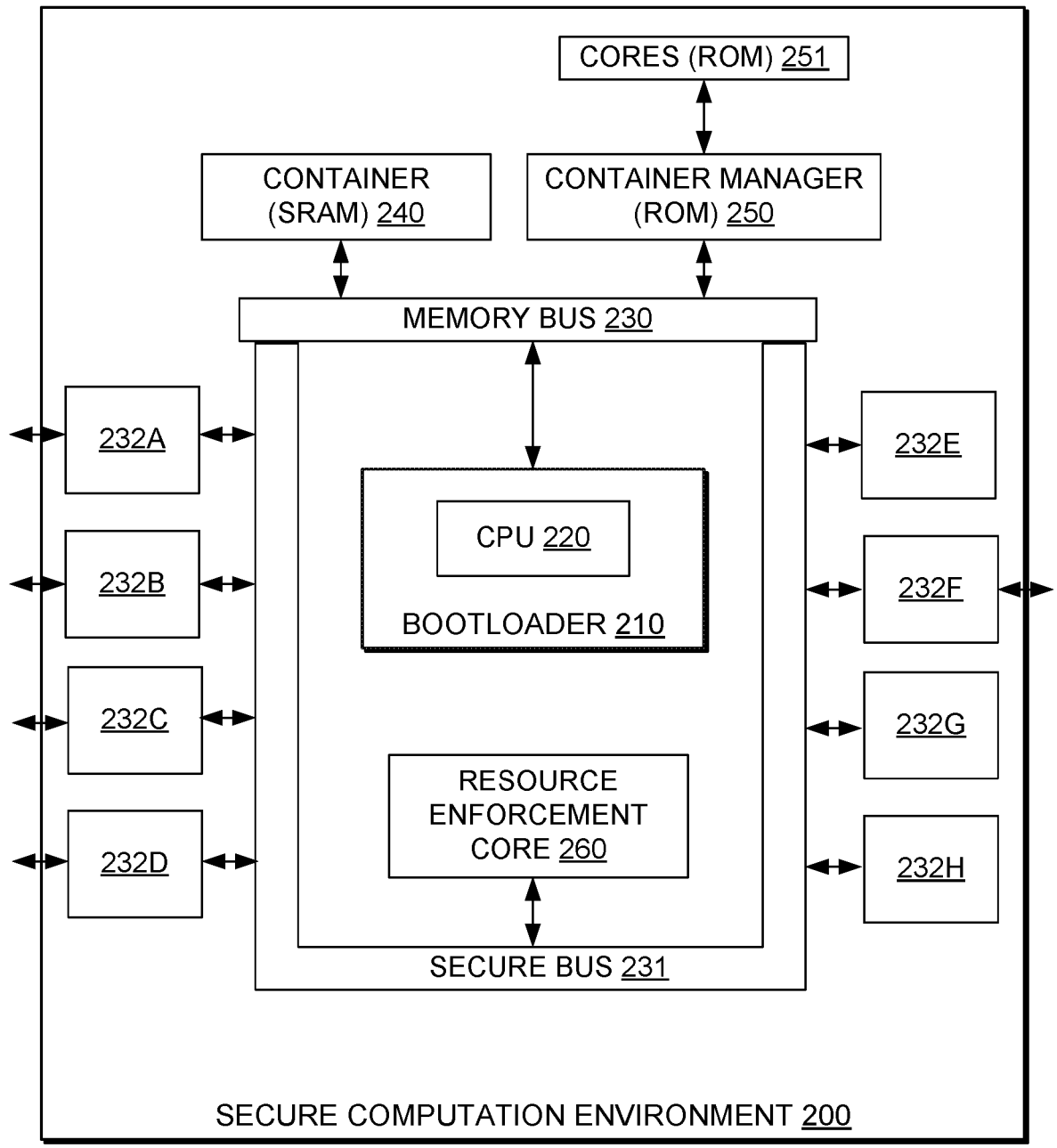
FIG. 2 illustrates an example architecture of a secure computation environment in accordance with some embodiments.

FIG. 2 illustrates an example architecture 200 of a secure computation environment. In general, the architecture 200 may include a bootloader 210 that corresponds to the bootloader 110 of FIG. 1, a container manager 250 that corresponds to the container manager 121 of FIG. 1, and a container 240 that corresponds to the one or more containers 130 of FIG. 1.

As shown in FIG. 2, the architecture 200 may include the bootloader 210 that controls a CPU 220 or other such processing device, a container manager 250 that is stored in ROM or other such memory, and a container 240 that is stored in static random access memory (SRAM) or other such memory. A memory bus 230 may couple the container 240 and the container manager 250 with the bootloader 210 and other resources 232A-H of the architecture 200.

The architecture 200 may include a resource enforcement core 260 that enforces control or access to the resources 232A-H of the architecture 200. Such resources may include, but are not limited to, one-time programmable (OTP) memory writes or burns, OTP reads, feature reads, feature writes, reading of cryptographic keys, updating of cryptographic keys, general purpose input/output (GPIO) reads, GPIO writes, an ability to execute code or instructions via or on the CPU 220, access to an executable region of the SRAM, read access to a particular portion of any such memory, write access to a particular portion of such memory, etc. The accesses may be fine grained. For example, the resource enforcement core may allow write access to one byte of the OTP but not to the next byte. Other resources may include access to functionality of cores 251 that are stored in ROM. Such cores 251 may correspond to elliptic curve cryptography (ECC) key generation, ECC signature verification, ECC signature generation, cryptographic key exchange, RSA key generation, RSA encryption or decryption, Advanced Encryption Standard (AES) encryption or decryption, SHA-2 or SHA-3 functionalities etc. In some embodiments, the resource enforcement core 260 may be programmed by the container manager 250 before the execution of each container 240. For example, a container 240 may include an identification of permissions to the features or resources 232A-H and the container manager 250 may program registers or memory of the resource enforcement core 260 based on the permissions of a container 240 that is to be executed. Thus, the resource enforcement core 260 may enforce access to the resources 232A-H via a secure bus 231 for containers 240 that have been verified by the container manager 250. In some embodiments, one or more of the resources 232A-H may be coupled to external components of a device that includes the architecture 200. For example, a resource 232B may be coupled to another system on a chip (SoC), OTP memory, a random number generator component, or other such components that are external to the secure computation environment.

Figure 3:
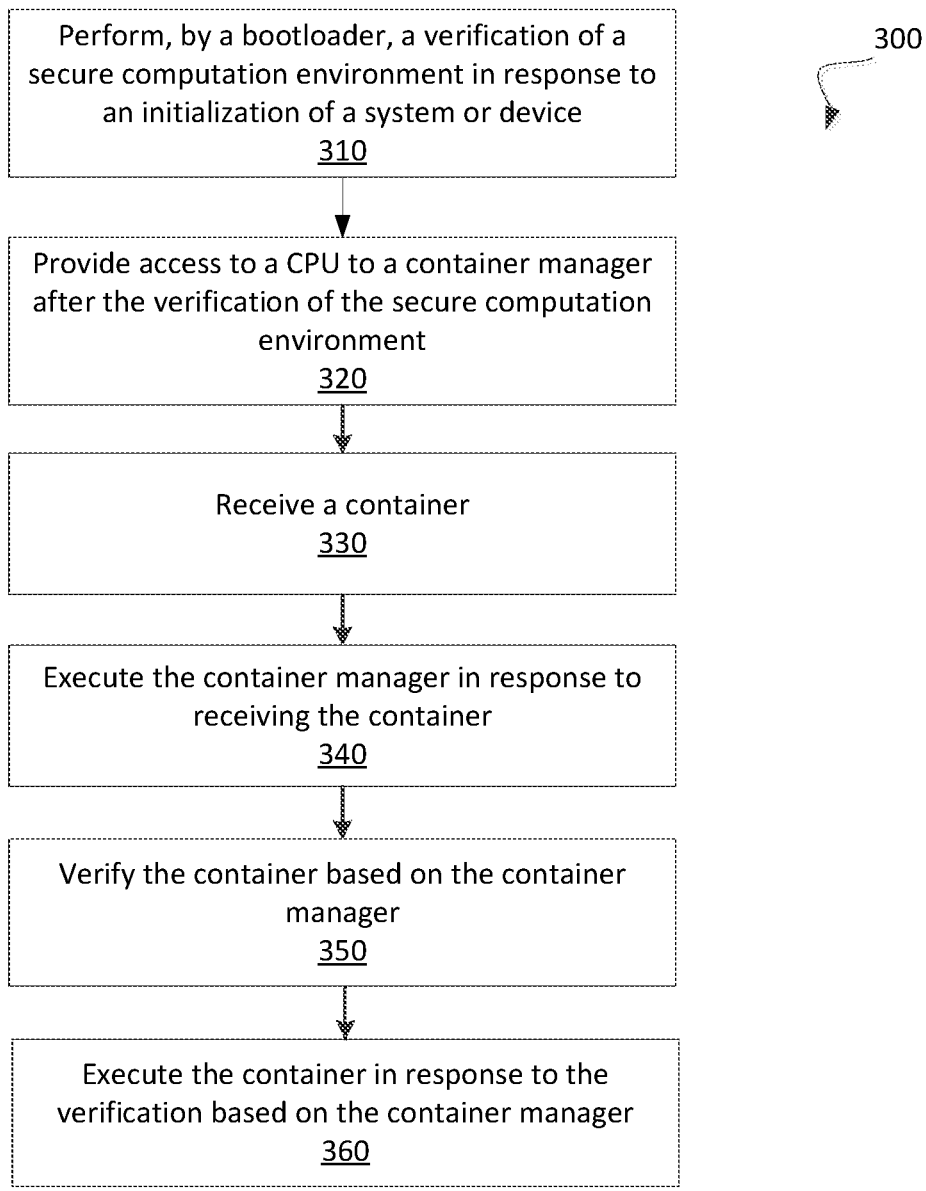
FIG. 3 is a flow diagram of an example method to provide a secure computation environment in accordance with some embodiments of the present disclosure.

FIG. 3 is a flow diagram of an example method 300 to provide a secure computation environment. In general, the method 300 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 corresponds to an execution flow between the bootloader 110 or 210 of FIG. 1 or 2, the container manager 121 or 250 of FIG. 1 or 2, and a container 130 or 240 of FIG. 1 or 2.

As shown in FIG. 3, the method 300 may begin with the processing logic performing a verification of a secure computation environment in response to an initialization of a system or a device that includes the secure computation environment (block 310). For example, a bootloader may perform a self-test of the secure computation environment that verifies hardware resources and a container manager. The processing logic may further provide access to a CPU to a container manager after the verification of the secure computation environment (block 320). For example, the control of the CPU may be transferred from the bootloader to the container manager and the container manager may be initiated or executed. The processing logic may further receive a container (block 330). For example, executable code may be received. The processing logic may subsequently execute the container manager in response to receiving the container (block 340). For example, the container manager may be executed each time that a container is received. Thus, in some embodiments, containers may be received in a series so that the containers timeshare the resources of the secure computation environment. The container manager may be separately executed each time that one of the containers is received. Thus, if a first container is received and a subsequent container is received, the container manager is executed a first time in response to receiving the first container and the container manager may be again executed a second time in response to receiving the subsequent container. As such, the container manager may be executed on-demand based on the receiving of containers. In some embodiments, the container manager may be executed after the received container initiates a system call to access a resource of the secure computation environment. The processing logic may verify the container based on the container manager (block 350). In response to the verification of the container by the container manager, the processing logic may further execute the container (block 360). For example, control or access to the CPU may be provided so that instructions of the container are executed. Thus, access or control of the CPU may be provided from the container manager to the container.

Figure 4:
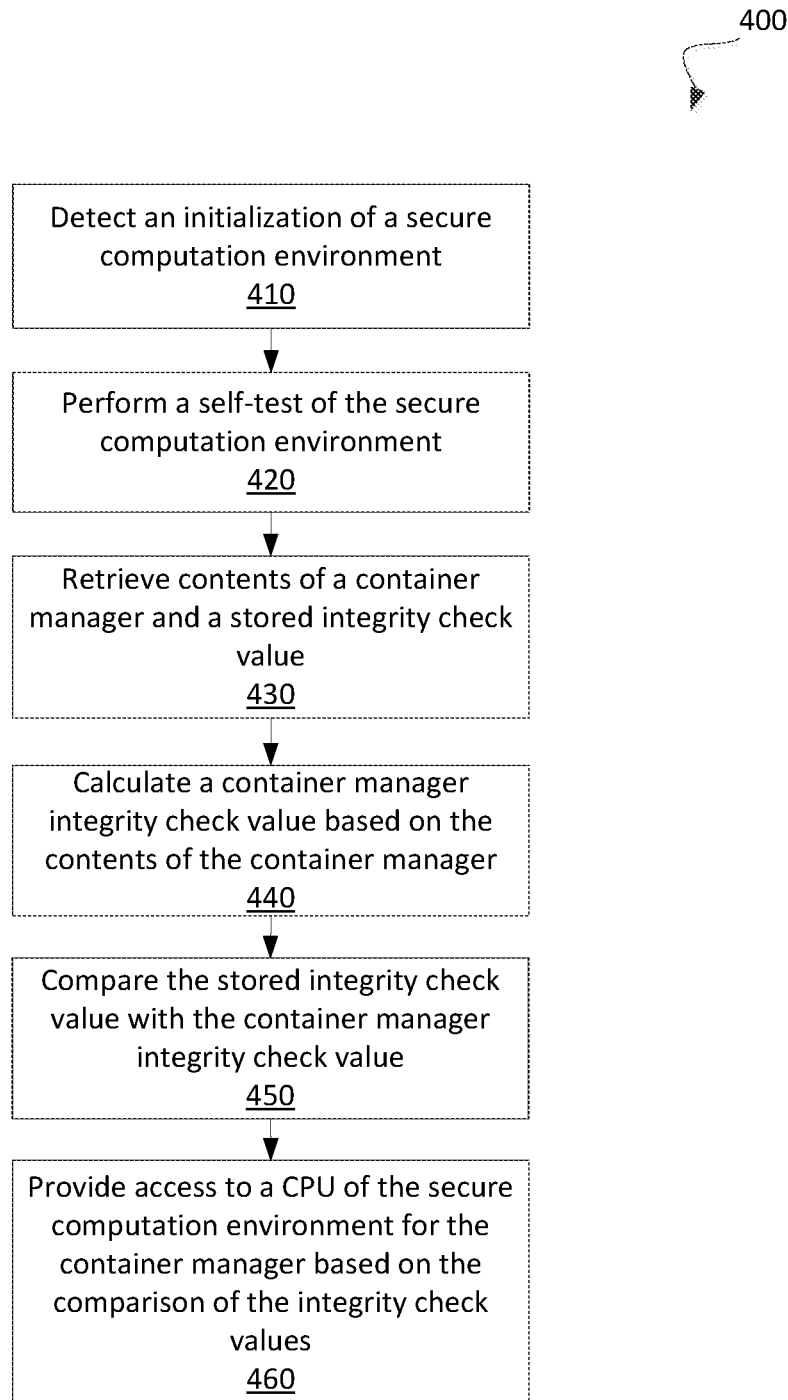
FIG. 4 is a flow diagram of an example method to execute a bootloader of a secure computation environment in accordance with some embodiments.

FIG. 4 is a flow diagram of an example method 400 to execute a bootloader of a secure computation environment. In general, the method 400 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 corresponds to an execution flow of the bootloader 110 or 210 of FIG. 1 or 2.

As shown in FIG. 4, the method 400 may begin with the processing logic detecting an initialization of a secure computation environment (block 410). For example, a device or system that includes the secure computation environment may be powered on or initiated after a reset. The processing logic may subsequently perform a self-test of the secure computation environment (block 420). For example, a hardware-based state machine may perform a series of steps or tests of one or more components of the secure computation environment. An example of such a component includes, but is not limited to, a CPU or a memory of the secure computation environment. The processing logic may further retrieve contents of a container manager and a stored integrity check value (block 430). For example, the contents of the container manager may be retrieved from a ROM of the secure computation environment and the stored integrity check value may be retrieved from the same ROM or another memory location within the secure computation environment. The processing logic may subsequently calculate a container manager integrity check value based on the contents of the container manager (block 440). For example, a hash function may be performed on the contents, or a portion of the contents, of the container manager to determine the container manager integrity check value.

The processing logic may subsequently compare the stored integrity check value with the container manager integrity check value (block 450). Furthermore, the processing logic may provide access to a CPU, or other such processing device or hardware resource, of the secure computation environment for the container manager based on the comparison of the integrity check values (block 460). For example, if the container manager integrity check value matches the stored integrity check value, then the container manager may be considered to be verified or authenticated and the access or control of the CPU may be provided to the container manager from the bootloader. However, if the container manager integrity check value does not match the stored integrity check value, then the container manager may be considered to be unverified or unauthorized and the access or control of the CPU may not be provided to the container manager from the bootloader.

As such, the bootloader may perform a self-test of resources of the secure computation environment and a verification of a container manager. After a successful self-test and a successful verification of the container manager, control or access to a CPU or processing device of the secure computation environment may be provided to the container manager. In some embodiments, the providing of the control or access to the CPU or processing device for a container manager may correspond to the using of the CPU or processing device for operations of the container manager.

Figure 5A:
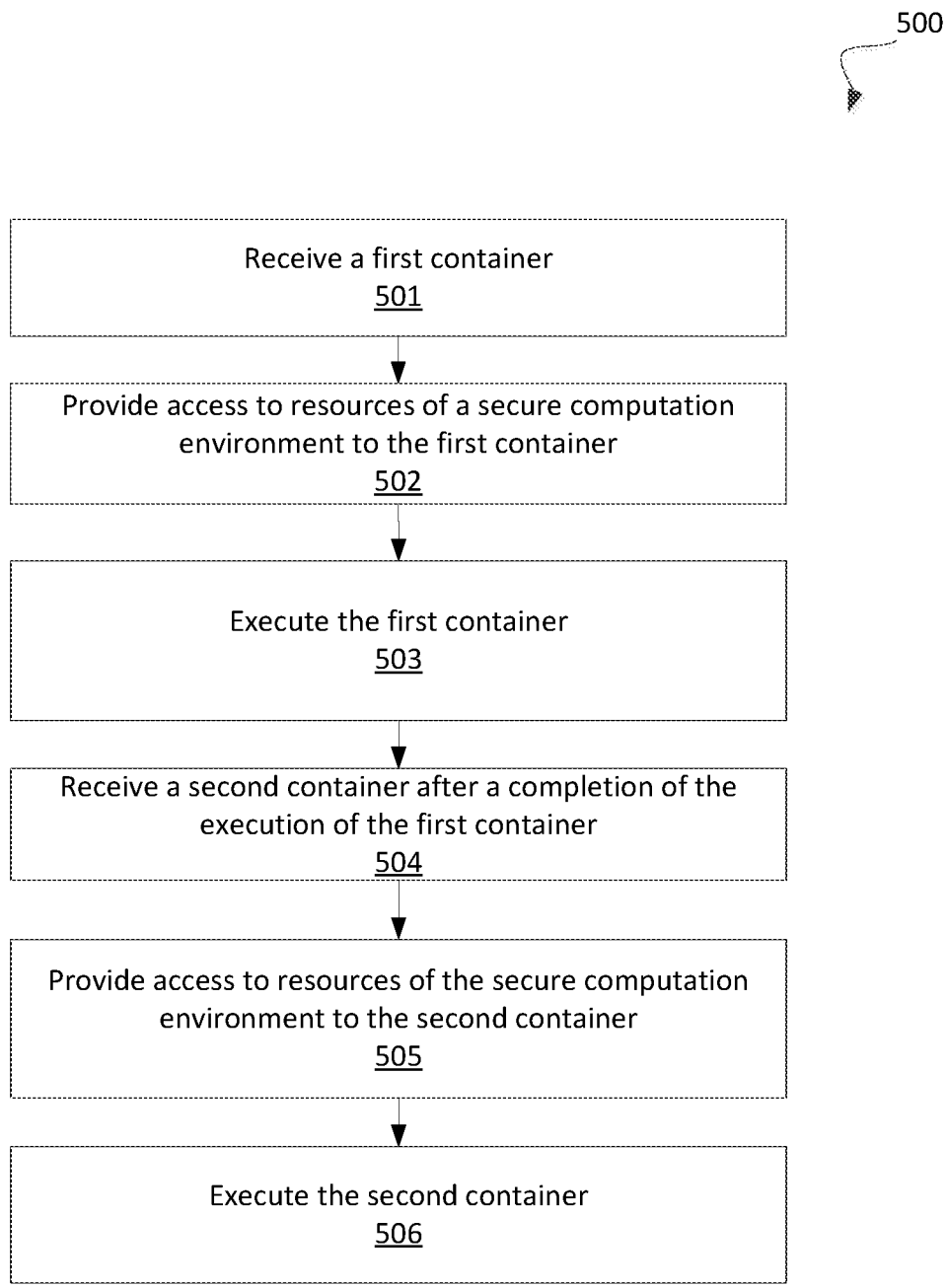
FIG. 5A is a flow diagram of an example method to provide timesharing of resources of a secure computation environment in accordance with some embodiments of the present disclosure.

FIG. 5A is a flow diagram of an example method 500 to provide timesharing of resources of a secure computation environment. In general, the method 500 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the container manager 121 or 250 of FIG. 1 or 2.

As shown in FIG. 5A, the method 500 may begin with the processing logic receiving a first container (block 501). For example, a container manager may receive a container after an initialization or execution of the container manager. In some embodiments, the container manager may be executed after a system call for accessing of resources of the secure computation environment has been received. The processing logic may further provide access to resources of the secure computation environment to the first container (block 502). For example, access to a CPU may be provided from the container manager to the first container. The providing of the control or access to the CPU or processing device for a container may correspond to the using of the CPU or processing device for operations or instructions of the container. The processing logic may subsequently execute the first container (block 503). For example, instructions of the first container may be performed by the CPU of the secure computation environment. Further details with regard to the execution of a container are described with regard to FIG. 5B.

The processing logic may subsequently receive a second container after a completion of the execution of the first container (block 504). For example, the second container may be received by the container manager after the first container. The processing logic may then provide access to resources of the secure computation environment to the second container (block 505) and may execute the second container (block 506).

As such, the resources of the secure computation environment may be timeshared between a series of containers. For example, a portion of the resources may be provided to a first container at a first time, and the portion or another portion of the resources may be provided to a subsequent second container at a second time that is after the first time.

Figure 5B:
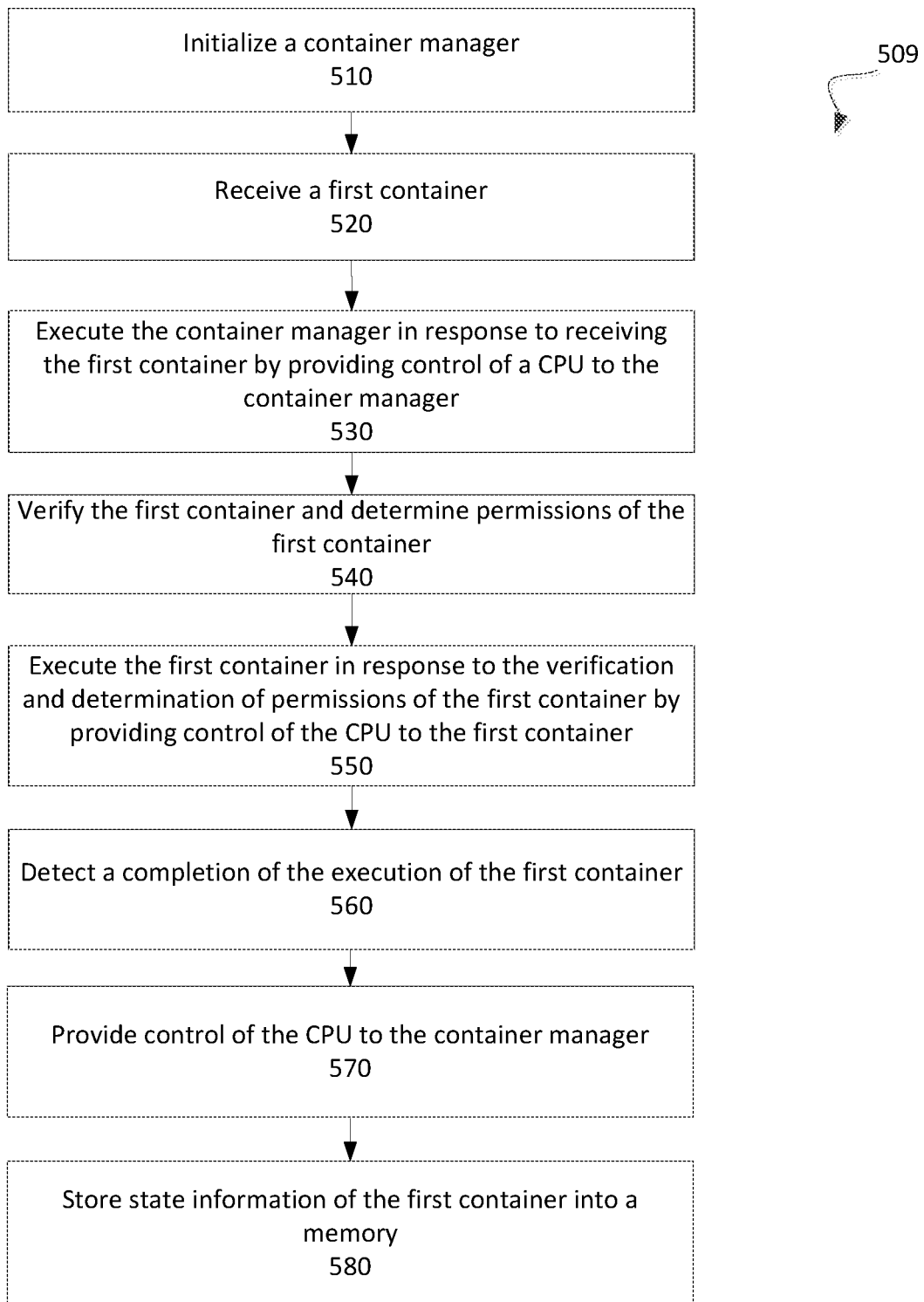
FIG. 5B is a flow diagram of an example method to execute a container manager of a secure computation environment in accordance with some embodiments of the present disclosure.

FIG. 5B is a flow diagram of an example method 509 to execute a container manager of a secure computation environment. In general, the method 509 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 509 may be performed by the container manager 121 or 250 of FIG. 1 or 2.

As shown in FIG. 5B, the method 509 may begin with the processing logic initializing a container manager (block 510). For example, the container manager may be initiated by a bootloader. The initiation of the container manager may perform an initial setup or an initialization routine of the container manager. The processing logic may further receive a first container (block 520). Furthermore, the processing logic may execute the container manager in response to receiving the first container by providing control or access to a CPU to the container manager (block 530). The processing logic may subsequently verify the first container (block 540). For example, the container manager may verify a signature of the first container. For example, the container manager may access a public key and verify a signature of the first container that is created by a corresponding private key (e.g., of a public-private key pair). For example, the container manager may access a symmetric key and may use a hash message authentication code (HMAC) operation to verify a signature of the first container that is created by a corresponding key. For example, the container manager may unconditionally consider the first container to be verified. In some embodiments, the container manager may further verify other properties of the container such as a format of the container, a version of the container, etc. In some embodiments, the verification of the container may further include a determination of the permissions of the container to access resources of the secure computation environment. After the verification of the container, one or more registers accessed by a resource enforcement core may be updated to reflect the permissions associated with the container to access the resources of the secure computation environment. In some embodiments, the container manager may dynamically modify the registers in the resource enforcement core as the container executes. Such a dynamic modification may change the permission granted to the container dynamically. For example, the container manager may provide an application programming interface (API) for the container to facilitate the updating of the registers. The processing logic may subsequently execute the first container in response to the verification of the first container by providing control or access of a CPU to the first container (block 550). For example, instructions of the first container may be executed by the CPU if the container satisfies particular cryptographic properties (e.g., the cryptographic signature is valid). The processing logic may further detect a completion of the execution of the first container (block 560). Subsequently, the processing logic may provide control of the CPU to the container manager (block 570). For example, the control or access to the CPU may be returned to the container manager from the container. The processing logic may further store state information of the first container into a memory (block 580). For example, the first container may store some data in the IPC memory or register for subsequent containers to use. For example, the first container may allow a subsequent container to operate with some of the permissions attributed to the first container. For example, the container manager may track the number of containers run so far and may provide this information to the containers or to the HLOS memory or register.

The container manager may use an identification of a container to decide which resources the container may have access to. For example, the identification of a container may be its hash (e.g., SHA-2 or SHA-3). For example, the identification may be the container's public key cryptography signature (e.g., ECSDA), or the public key corresponding to the private key to generate the signature. For example, the identification may be the container's HMAC. Optionally, the identification may also include a version number or revision number of the container that identifies a revision history of the executable code of the container. Optionally, the identification may be a hash of a combination of various fields (e.g., the identification is the result of an SHA-2 operation of the public key and revision number of the container).

As such, the container manager may be executed in response to the receiving of a container and any other subsequent containers. Control or access to a CPU or other hardware resources of a secure computation environment may be provided to a container in response to a verification of the container by the container manager. After the completion of the execution of the container, the control or access to the CPU may be returned to the container manager and state information of the container that was executed may be stored in a memory of the secure computation environment.

Figure 6:
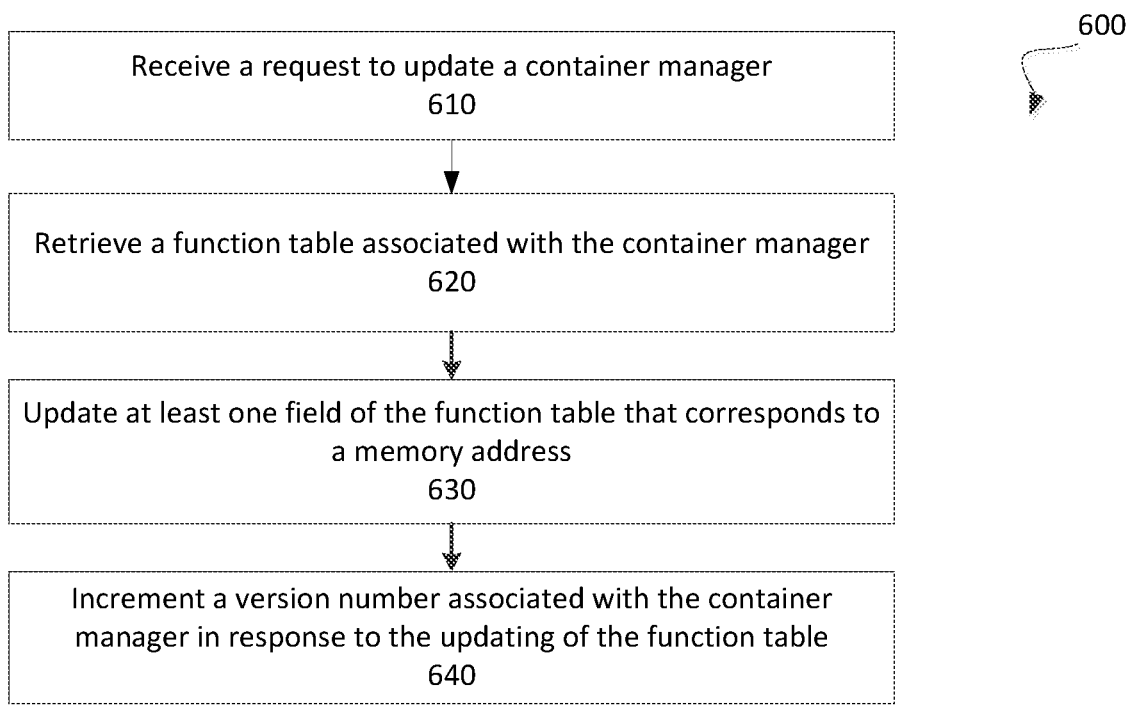
FIG. 6 is a flow diagram of an example method to update a container manager in accordance with some embodiments of the present disclosure.

FIG. 6 is a flow diagram of an example method 600 to update a container manager. In general, the method 600 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 may be performed by the container manager 121 or 250 or another component of a secure computation environment of FIG. 1 or 2.

As shown in FIG. 6, the method 600 may begin with the processing logic receiving a request to update a container manager (block 610). For example, the request to update the container manager may identify a particular instruction or operation of the container manager and a memory address location for the contents of the instruction or operation. The processing logic may further retrieve a function table associated with the container manager (block 620). The function table may correspond to ordered pairs of entries where a first entry of a pair identifies a particular type of instruction or operation and the second entry of the pair identifies a memory address location that includes contents for the instruction or operation. The processing logic may subsequently update at least one field of the function table that corresponds to the memory address (block 630). For example, the function table may be stored in a memory where the memory may be modified to change a memory address location to a new memory address location.

The execution of the container manager may be based on a use of the function table. For example, the container manager may be used with the function table to perform instructions or operations based on the memory address location corresponding to an instruction or operation. Thus, the updating of the container manager may result in a change of a memory address location for at least one instruction or operation of the container manager.

Referring to FIG. 6, the processing logic may increment a version number associated with the container manager in response to the updating of the function table (block 640). For example, the version number located in a memory location may be incremented or increased in response to the updating of the container manager. In some embodiments, the version number may be stored by the bootloader in OTP or other non-volatile medium (NVM). The bootloader may restrict any containers from execution if the current version number is not higher or equal to the maximum of all the previously stored version numbers. In some embodiments, the version number of the container manager may be provided to containers. Each container may retrieve the version number of the container manager and may compare the version number of the container manager to a version number identified within the container. If the version number of the container manager does not match the version number identified within the container, then the container may not execute (e.g., the instructions of the container manager may not be performed). However, if the version number of the container manager does match the version number identified within the container, then the container may execute. As such, the version number of the container manager may be used by a container to verify the container manager before the execution of the container.

Figure 7:
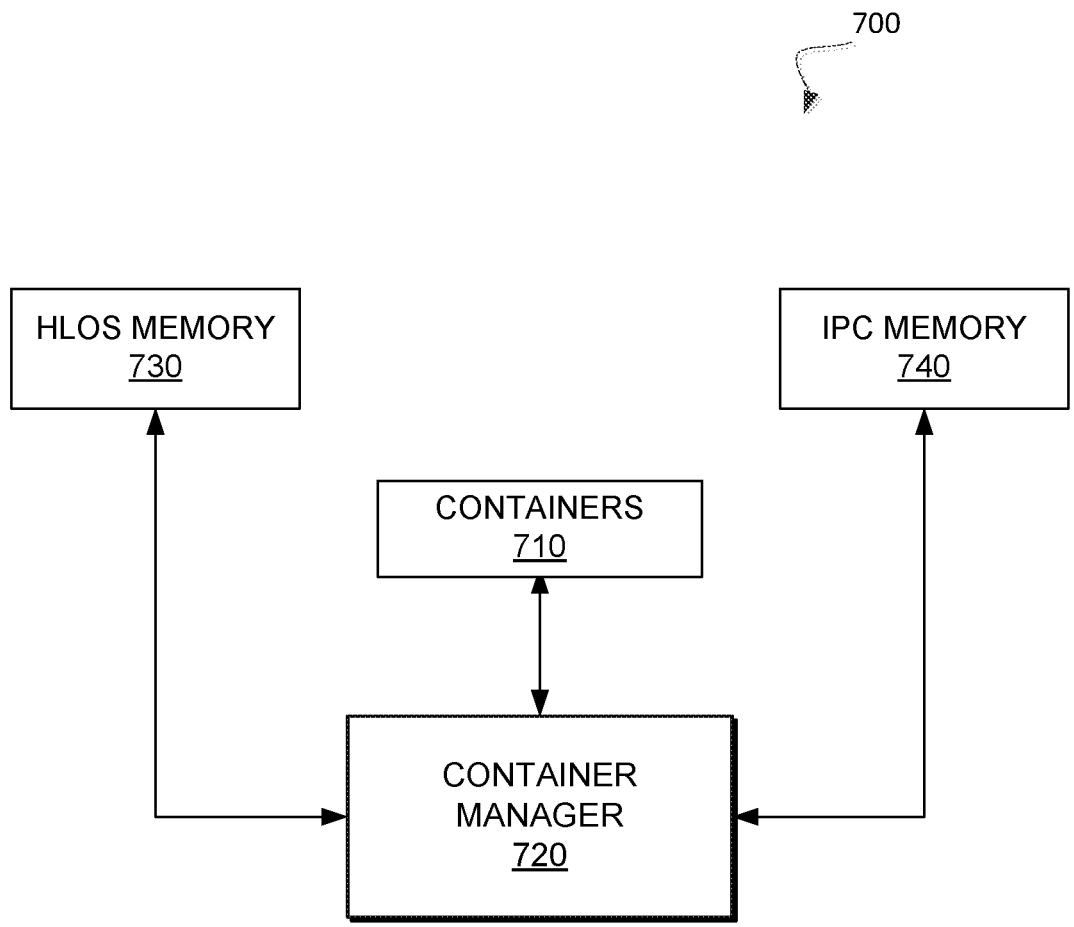
FIG. 7 illustrates an example container manager interacting with one or more containers and memory locations in accordance with some embodiments.

FIG. 7 illustrates an example environment 700 of a container manager interacting with one or more containers. In general, the environment 700 may include a container manager 720 that corresponds to the container manager 121 or 250 of FIG. 1 or 2.

As shown in FIG. 7, the environment 700 may include a container manager 720 that receives one or more containers 710. The container manager 720 may further be coupled to a high level operating system (HLOS) register or memory 730 and an inter-process communication (IPC) register or memory 740. The container manager 720 may execute one of the containers 710 and may provide an indication of a request for data from the executed container to a component that is external to the secure computation environment via the HLOS memory 730. The container manager 720 may subsequently retrieve the data from the HLOS memory 730 and provide the data to the executed container. Further details with regard to the HLOS memory 730 are described in conjunction with FIG. 10.

The container manager may further provide access to an IPC memory 740 to provide communication between at least two of the containers 710. For example, data may be received from a first container that is received and executed by the container manager 720 and the data may be stored in the IPC memory 740 for retrieval by a subsequent second container that is received by the container manager 720. Further details with regard to the IPC memory 740 are described in conjunction with FIGS. 8-9.

Figure 8:
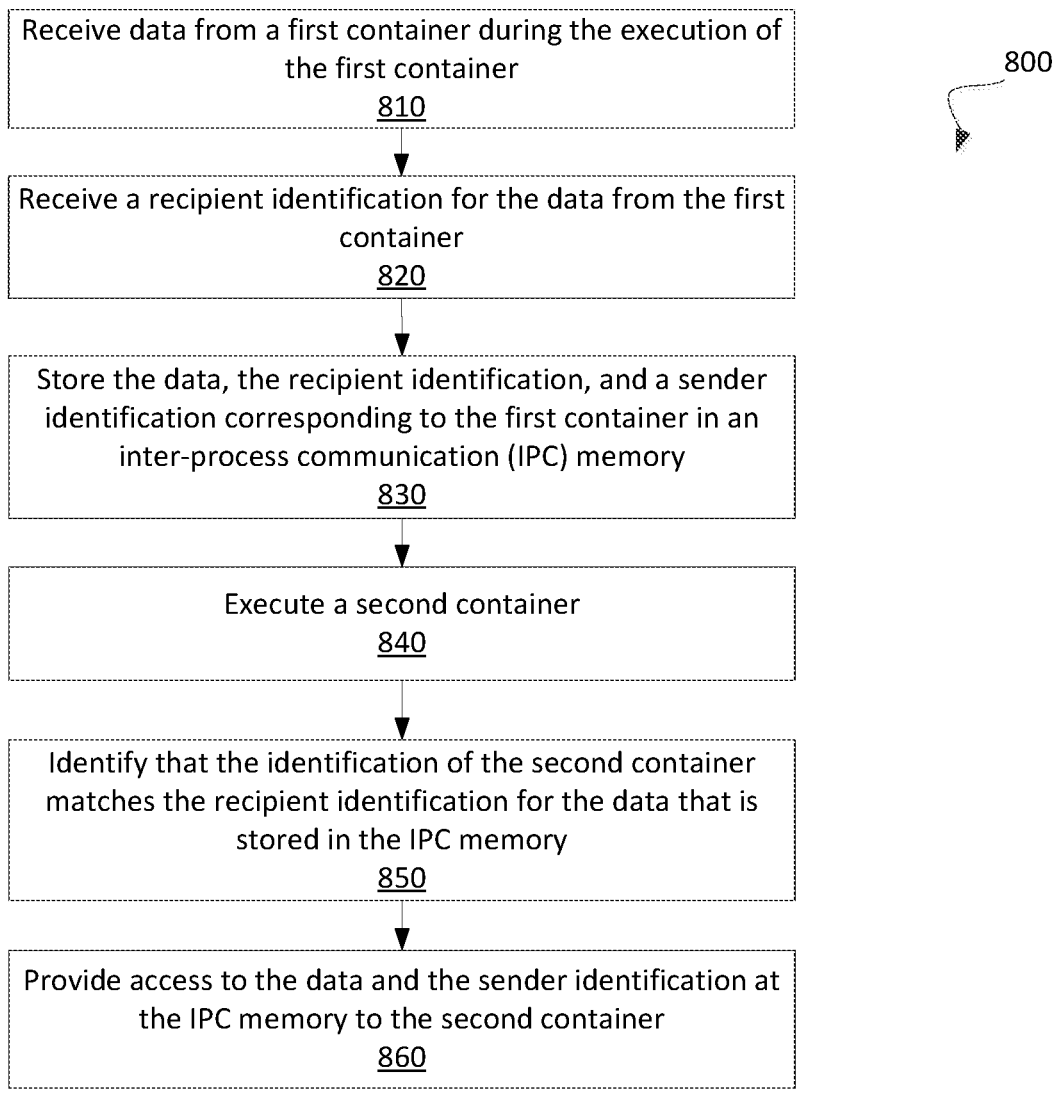
FIG. 8 illustrates an example method to provide interaction between containers in accordance with some embodiments of the present disclosure.

FIG. 8 illustrates an example method 800 to provide interaction between containers. In general, the method 800 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 may be performed by the container manager 121 or 250 or another component of a secure computation environment of FIG. 1 or 2.

As shown in FIG. 8, the method 800 may begin with the processing logic receiving data from a first container during the execution of the first container (block 810). The processing logic may further receive a recipient identification for the data from the first container (block 820). For example, the recipient identification may correspond to the identification of another container. The processing logic may subsequently store the received data, the recipient identification of the other container, and a sender identification of the data that corresponds to the first container in an inter-process communication (IPC) memory or register (block 830). The processing logic may subsequently execute a second container (block 840). For example, a second container may be received after the receiving and execution of the first container. The processing logic may identify that the identification of the second container matches the recipient identification for the data that is stored in the IPC memory (block 850). Furthermore, the processing logic may provide access to the data and the sender identification at the IPC memory to the second container (block 860).

In some embodiments, the second container may execute instructions with the data from the IPC memory based on a condition associated with the sender identification of the data. For example, the instructions may be executed if the sender identification matches a particular sender identification from the second container or the instructions may not be executed if the sender identification does not match a particular sender identification from the second container.

As such, data from a first container may be stored in a memory location of a secure computation environment. A second container that is executed after the first container may be provided access to the data at the memory location.

Figure 9:
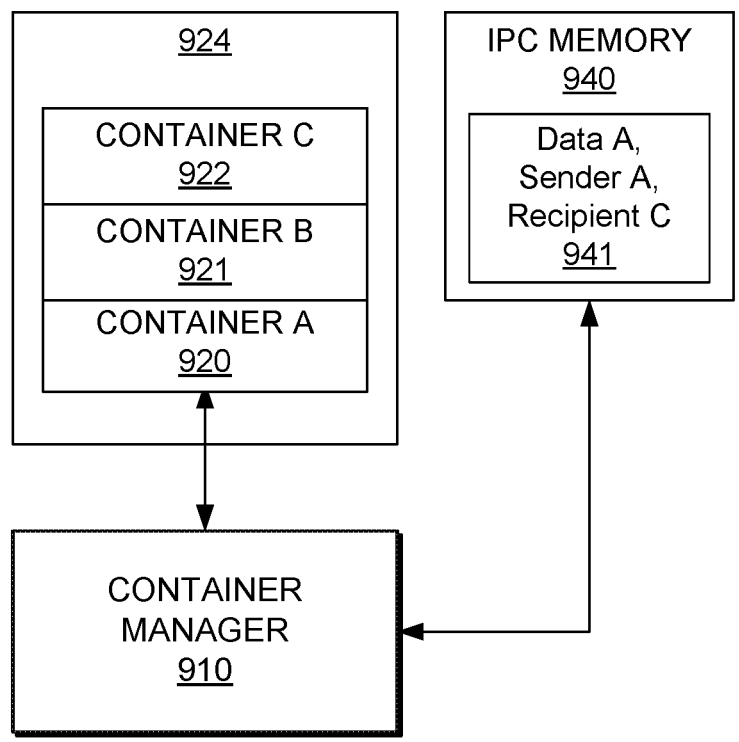
FIG. 9 illustrates an example of containers interacting with a memory in accordance with some embodiments.

FIG. 9 illustrates an example of containers interacting with a memory. In general, a container manager 910, which may correspond to the container manager 121 or 250 of FIG. 1 or 2, may provide interaction between containers based on an IPC memory 940.

As shown in FIG. 9, the container manager 910 may be coupled to an IPC memory 940 and a container pipeline 924. The container pipeline 924 may include a first container 920 'A,' a second container 921 'B,' and a third container 922 'C.' The container manager 910 may receive the first container 920 'A' which may be executed. The instructions of the first container 920 'A' may specify for data A to be stored in the IPC memory 940 for the third container 922 'C.' For example, the container manager 910 may store an entry in the IPC memory 940 that includes the data A, an identification of the first container 920 (e.g., sender 'A'), and a recipient of the data (e.g., recipient 'C'). The container manager 910 may subsequently receive the second container 921 'B' after the completion of the execution of the first container 920 'A.' The second container 921 'B' may not be allowed access to the data in the IPC memory 940 as the identification of the second container 921 (e.g., 'B') does not match the recipient identification of the data (e.g., 'C'). At a later time, the container manager 910 may receive the third container 922 'C.' Since the identification of the third container 922 (e.g., 'C') matches the recipient identification for the data in the IPC memory 940, the container manager 910 may provide access to the data in the IPC memory 940 to the third container 922 with the identification of 'C.'

Figure 10:
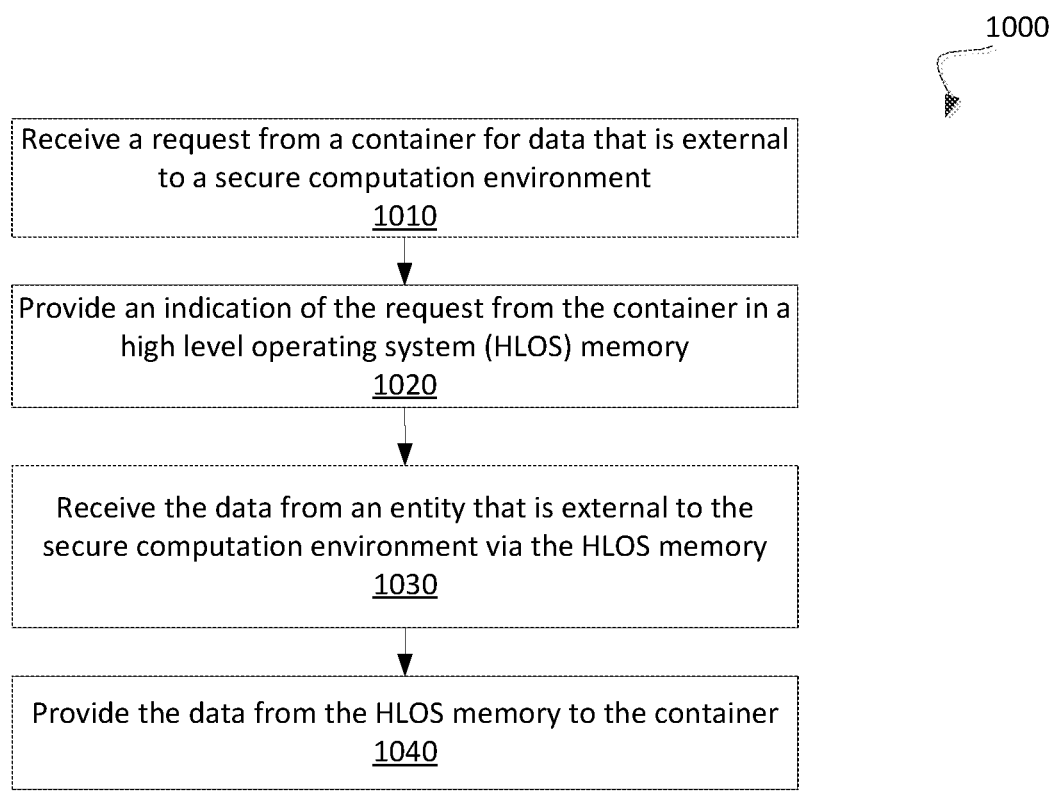
FIG. 10 illustrates an example method of a container interacting with a component outside of the secure computation environment in accordance with some embodiments.

FIG. 10 illustrates an example method 1000 of a container interacting with a component outside of the secure computation environment. In general, the method 1000 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 may be performed by the container manager 121 or 250 or another component of a secure computation environment of FIG. 1 or 2.

As shown in FIG. 10, the method 1000 may begin with the processing logic receiving a request from a container for data that is external to a secure computation environment (block 1010). For example, the data may correspond to data that is received from a component of a device that is not within the secure computation environment. The processing logic may subsequently provide an indication of the request from the container in a high level operating system (HLOS) memory or register (block 1020). For example, a container manager may modify the contents of an HLOS memory to indicate that a component within the secure computation environment has requested data from a component that is coupled to the HLOS memory. The processing logic may subsequently receive the data from an entity that is external to the secure computation environment via the HLOS memory (block 1030). For example, the component that is not within the secure computation environment may provide the data that has been requested by storing the data into the HLOS memory. Furthermore, the processing logic may provide the data form the HLOS memory to the container (block 1040). For example, the container manager may retrieve the data that has been stored in the HLOS memory and may provide the data to the container for execution by the container.

In some embodiments, the HLOS memory may be the only memory locations within the secure computation environment that are accessible to entities or components that are external to the secure computation environment.

Figure 11:
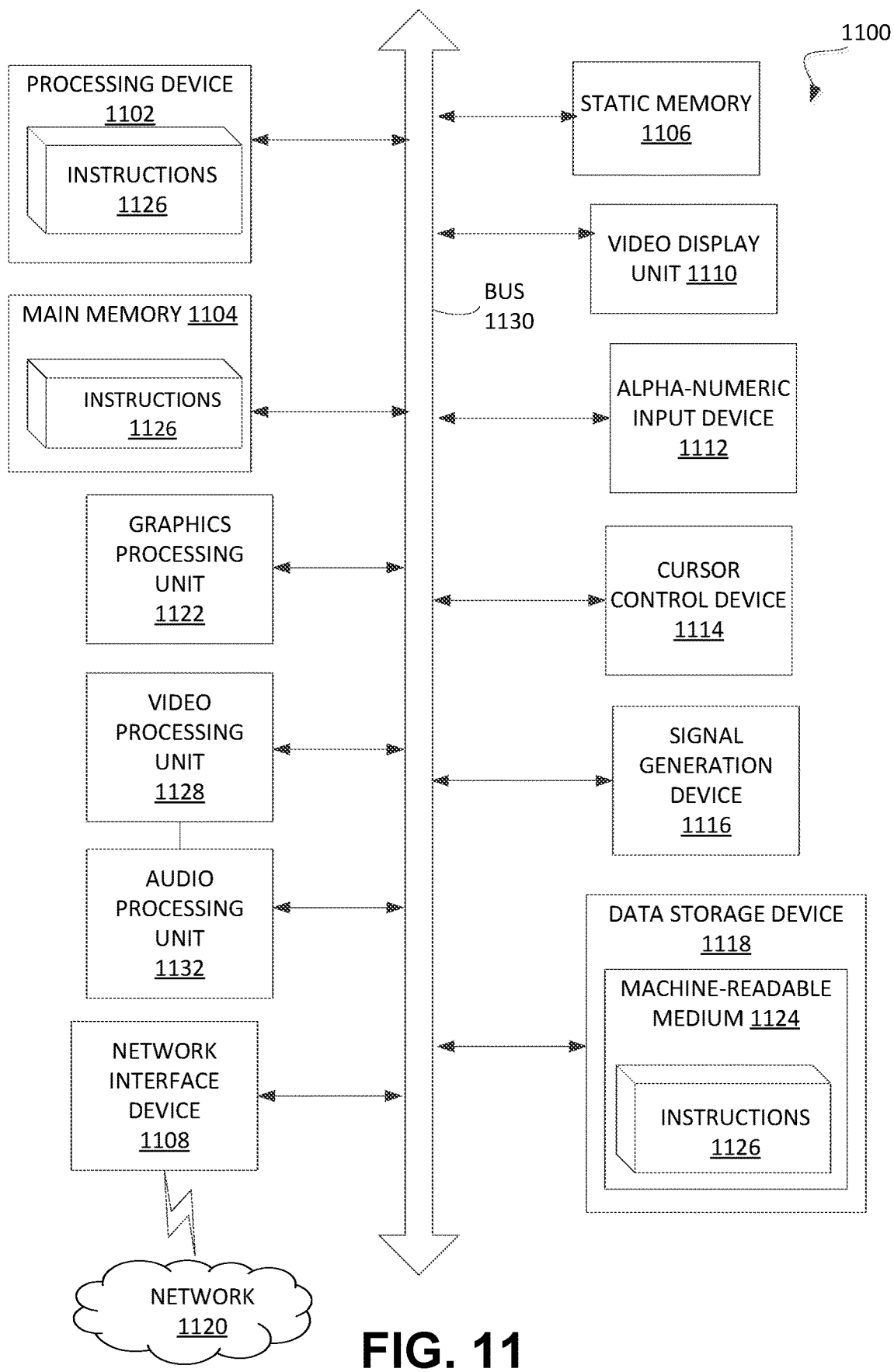
FIG. 11 illustrates a block diagram of an embodiment of a computer system in which some embodiments of the disclosure may operate.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a computer-readable medium) on which is stored one or more sets of instructions or software 1126 embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In one implementation, the instructions 1126 include instructions to implement functionality corresponding to a container manager (e.g., container manager 121 or 200 FIG. 1 or 2). While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving a container corresponding to executable code and permissions of the container to access resources of a computation environment;
   in response to the receiving of the container, executing a container manager resident in a memory of the computation environment to verify the permissions of the container and verify authenticity of the container, wherein the container manager is verified by a boot loader of the computation environment;
   updating one or more registers of a resource enforcement core of the computation environment according to the permissions of the container after the verification of the permissions of the container and the authenticity of the container by the container manager, wherein the resource enforcement core is to enforce access to the resources of the computation environment;
   transferring, by a processing device, control of the processing device from the container manager to the container; and
   providing, by the processing device, access to one or more resources of the computation environment using the one or more registers according to the permissions of the container.

2. The method of claim 1, further comprising:
receiving data from the container, wherein the data is for a second container; and
storing the data and an identification of the second container in another memory of the computation environment.

3. The method of claim 1, the method further comprising:
receiving a version number associated with the container manager; and
executing the container based on a comparison of the version number associated with the container manager and another version number associated with the container manager stored in the container.

4. The method of claim 1, further comprising:
receiving, from the container, a request to receive data from a component that is external to the computation environment; and
storing an indication of the request to receive data into another memory of the computation environment, wherein the another memory is accessed by the component that is external to the computation environment.

5. The method of claim 1, further comprising:
executing the container; and
after the executing of the container, storing state information associated with the container in another memory of the computation environment.

6. The method of claim 1, wherein the verification of the authenticity of the container corresponds to a verification of a cryptographic signature of the container.

7. The method of claim 1, further comprising:
in response to transferring control to the container, executing the container to verify the container manager.

8. The method of claim 1, further comprising:
receiving a first version number associated with the container manager; and
executing the container to verify the container manager by comparing the first version number and a second version number stored in the container, wherein the container manager is verified in response to a match between the first version number and the second version number.

9. The method of claim 2, further comprising:
receiving the second container after a completion of an execution of the container, wherein the second container corresponds to additional executable code; and
providing the data from the another memory of the computation environment to the second container in response to an identification of the second container matching the identification of the second container in the another memory of the computation environment.

10. A system comprising:
a memory; and
a processing device operatively coupled with the memory to:
receive a container corresponding to executable code and permissions of the container to access resources of a computation environment;
in response to receiving of the container, execute a container manager resident in the memory of the computation environment to verify the permissions of the container and verify authenticity of the container, wherein the container manager is verified by a boot loader of the computation environment;
update one or more registers of a resource enforcement core of the computation environment according to the permissions of the container after the verification of the permissions of the container and the authenticity of the container by the container manager, wherein the resource enforcement core is to enforce access to the resources of the computation environment; and
transfer control of the processing device from the container manager to the container; and
provide access to one or more resources of the computation environment using the one or more registers according to the permissions of the container.

11. The system of claim 10, wherein the processing device is further to:
receive data from the container, wherein the data is for a second container; and
store the data and an identification of the second container in another memory of the computation environment.

12. The system of claim 10, wherein the processing device is further to:
receive a version number associated with the container manager; and
execute the container based on a comparison of the version number associated with the container manager and another version number associated with the container manager stored in the container.

13. The system of claim 10, wherein the processing device is further to:
receive, from the container, a request to receive data from a component that is external to the computation environment; and
store an indication of the request to receive data into another memory of the computation environment, wherein the another memory of the computation environment is accessed by the component that is external to the computation environment.

14. The system of claim 10, wherein the processing device is further to: execute the container; and
after executing of the container, store state information associated with the container in another memory of the computation environment.

15. The system of claim 10, wherein the verification of the authenticity of the container corresponds to a verification of a cryptographic signature of the container.

16. The system of claim 11, wherein the processing device is further to:
receive the second container after a completion of an execution of the container, wherein the second container corresponds to additional executable code; and
provide the data from the another memory of the computation environment to the second container in response to an identification of the second container matching the identification of the second container in the another memory of the computation environment.

17. A non-transitory computer readable medium comprising instructions that, when executed by a processing device, cause the processing device to perform operations comprising:
receiving a container corresponding to executable code and permissions of the container to access resources of a computation environment;
in response to the receiving of the container, executing a container manager resident in a memory of the computation environment to verify the permissions of the container and verify authenticity of the container, wherein the container manager is verified by a boot loader of the computation environment;
updating one or more registers of a resource enforcement core of the computation environment according to the permissions of the container after the verification of the permissions of the container and the authenticity of the container by the container manager, wherein the resource enforcement core is to enforce access to the resources of the computation environment;

transferring control of the processing device from the container manager to the container; and providing access to one or more resources of the computation environment using the one or more registers according to the permissions of the container.

18. The non-transitory computer readable medium of claim 17, the operations further comprising:

receiving data from the container, wherein the data is for a second container; and storing the data and an identification of the second container in another memory of the computation environment.

19. The non-transitory computer readable medium of claim 17, the operations further comprising:

receiving a version number associated with the container manager; and executing the container based on a comparison of the version number associated with the container manager and another version number associated with the container manager stored in the container.

20. The non-transitory computer readable medium of claim 17, the operations further comprising:

receiving, from the container, a request to receive data from a component that is external to the computation environment; and storing an indication of the request to receive data into another memory of the computation environment, wherein the memory is accessed by the component that is external to the computation environment.

21. The non-transitory computer readable medium of claim 17, the operations further comprising:

executing the container; and after the executing of the container, storing state information associated with the container in another memory of the computation environment.

22. The non-transitory computer readable medium of claim 18, the operations further comprising:

receiving the second container after a completion of an execution of the container, wherein the second container corresponds to additional executable code; and providing the data from the another memory of the computation environment to the second container in response to an identification of the second container matching the identification of the second container in the another memory of the computation environment.

* * * * *